April 1, 1969    E. J. SIFF ET AL    3,436,706
VARIABLE INDUCTOR HAVING ARMATURE MOVABLE IN AIR GAP
Filed July 28, 1965

INVENTORS
ELLIOTT J. SIFF
IRVING SCHAFFER
BY
*Pennie, Edmonds, Morton, Taylor & Adams*
ATTORNEYS

United States Patent Office 3,436,706
Patented Apr. 1, 1969

3,436,706
VARIABLE INDUCTOR HAVING ARMATURE MOVABLE IN AIR GAP
Elliott J. Siff, Bridgeport, and Irving Schaffer, Fairfield, Conn., assignors to American Chain & Cable Company, Inc., New York, N.Y., a corporation of New York
Filed July 28, 1965, Ser. No. 475,434
Int. Cl. H01f 21/06, 7/08, 5/00
U.S. Cl. 336—134          5 Claims

ABSTRACT OF THE DISCLOSURE

Pick-up means for a gyro wherein a stator is in the form of two coplanar E's with their center legs connected and outer legs defining a pair of gaps, four secondary coils are disposed on the respective four outer legs and a primary coil is disposed on the common center leg of the stator, and an armature free of magnetizing means is disposed such that its end portions can precess back and forth in planes bisecting the respective gaps.

---

This invention relates to a signal means for translating the movement of a member into an electrical signal. In its preferred embodiment the invention is specifically directed to a means for translating the precession of a gyroscope into an electrical signal for the guidance of a vehicle.

One of the most important elements of a gyroscope adapted for use in guidance systems is the means for translating a movement about a given axis into a signal which can be utilized for informational purposes or to make a necessary correction in the attitude of a moving vehicle. For example, in the guidance of a high speed missile, the change in the missile's pitch must be instantly and accurately recognized, a signal generated, and the particular guidance mechanisms activated to keep the missile on its desired course. Control of the missile's position on its roll and yaw axes is equally important.

The advent of increasingly high speeds, radical temperature changes, higher thrusts and similar environmental disturbances to which missiles, aircraft and other vehicles are subjected, places a premium upon simplicity, reliability and accuracy of the gyroscope and upon the means for sensing the gyro's precession and generating a meaningful signal.

Where subminiature gyroscopes are required by reason of the design limitations of the particular vehicle, especially the limited space requirements, it is apparent that the difficulties of obtaining satisfactory guidance signals is compounded. Signal means (commonly known as "pick-off" means) of the conventional type, suffer from inaccuracy, unreliability, bulkiness, and the need for constant adjustment. For example, the microsyn type pick-off assembly, the principal type available, demands the accurate maintenance of concentricities between the armature and stator mounted on separate pieces. The common "EI" assembly used in transducers and some gyros tends to generate erroneous signals because of armature and stator misalignment both under static and dynamic environments.

An improved pick-off means has been described in co-pending application Ser. No. 365,669 filed May 7, 1964, now abandoned, and assigned to the same assignee. Although the pick-off means there disclosed is a novel advance in the art, it, too, has certain limitations. It has been found that slight eddy currents and distortions in the field may be induced as the gyro precesses, thus causing some error in the generated signals. In certain positions of the armature there occurs a shunting of portions of the magnetic field, which also results in some inaccuracy.

These limitations have been overcome by the unique device of the present invention. This invention comprises a pick-off means wherein a highly stable, undistorted magnetic field is established in which the armature moves. Further, the field remains substantially undistorted during the gyro's precession so that the signal is virtually error-free.

Broadly, the invention is for a means for translating the movement of a movable member into an electrical signal. The means comprises a stator having a primary core member with primary coils wound thereon and at least two pairs of opposed secondary core members having secondary coils wound thereon. An armature is attached to the movable member and is movable therewith. The stator and armature are oriented with respect to each other such that one end of the armature is disposed between one pair of the opposed secondary core members and the other end of the armature is disposed between the other pair of opposed secondary core members when the armature is in the null position.

While the pick-off means of this invention will be described in the context of sensing the precession of a gyroscope it is understood that its application is not limited to gyros only. The invention has application to any number of devices wherein a substantially linear movement is to be sensed.

A preferred embodiment of the invention is described below with refrence to the accompanying drawings.

Figure 1:
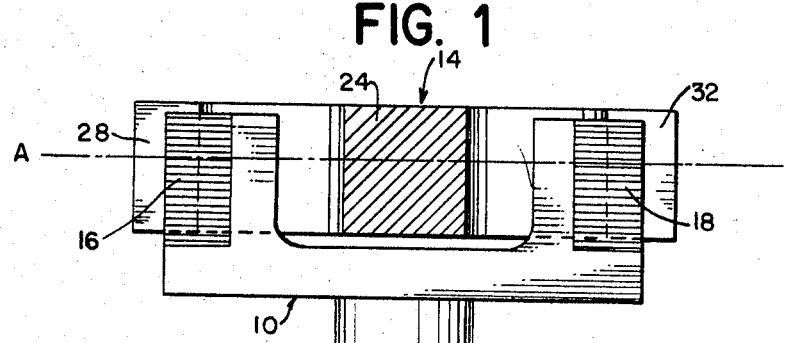
FIG. 1 is a partial sectional elevation of the pick-off means.

Referring to FIG. 1, there is shown an armature 10 affixed to one end of a movable member 12. The movable member 12 is movable either to the right or to the left as seen in FIG. 1. Thus the armature 10 moves with the member 12 and in so doing travels substantially along the line designated as A in the drawings.

The armature 10 is movable with respect to a fixed stator 14 which provides the magnetic field through which the armature passes. The signal is generated by reason of the relative movement of the armature 10 and the stator 14 out of the null position illustrated in the drawings.

In its preferred embodiment, the signa means of the invention is for translating the precession of a gyroscope into an electrical signal. The movable member 12 is, more specifically, a shaft about which a rotor (not shown) of a gyroscope spins. The pick-off means is particularly adapted to sense the precession of the gyroscope about a single precession axis. Referring to FIG. 1, then, the shaft 12 can precess or tilt either to the right or left only. The armature 10 is thus oriented so that its longitudinal axis is perpendicular to the spin axis and to the precession axis of the gyroscope.

Precession of a gyro necessarily indicates that a rotary motion is taking place. Therefore, it is important to explain here that where the pick-off means of the invention is used in connection with a gyroscope the armature 10 does not move precisely along the line A but rather describes an arc about the precession axis. However, in the sub-miniature gyroscope art the precession encountered is generally limited to several degrees of arc; in the order of about one to three degrees. Where the signal means is so used it may be fairly said that the armature 10 travels along a substantially linear course.

The armature 10 may be of a magnetically permeable material. Advantageously the armature 10 is made of a non-magnetic steel and is provided with laminated insets 16 and 18 of high magnetic permeability, the purpose of which is to increase the sensitivity of the pick-off means by localizing the flux.

Figure 2:
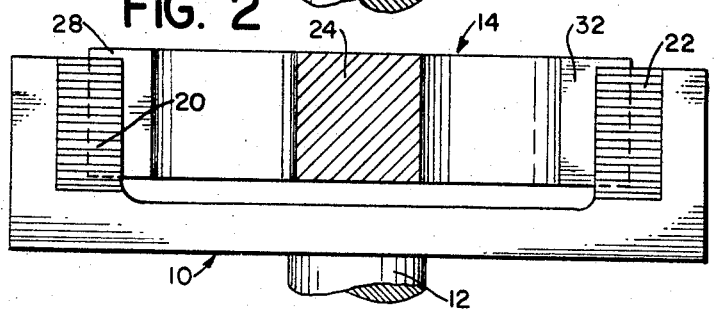
FIG. 2 is a partial sectional elevation of another embodiment of the invention illustrating a modification of the armature of FIG. 1.

In FIG. 1 the insets 16 and 18 are shown at the outer ends of the armature 10. This is preferable where the armature 2 is of shorter length than the comparable length of the stator 14. In FIG. 2 the insets 20 and 22 are adjacent but interior of the outer ends of the armature. In this latter embodiment the armature 10 is of greater length than the comparable length of the stator. The location of the insets 20 and 22 as seen in FIG. 2 has the advantage of being even less likely to cause a short circuiting of the magnetic field established by the stator 14 than the embodiment of FIG. 1. However, where space is a consideration, as in sub-miniature gyros, the embodiment of FIG. 1 is preferable.

Figure 3:
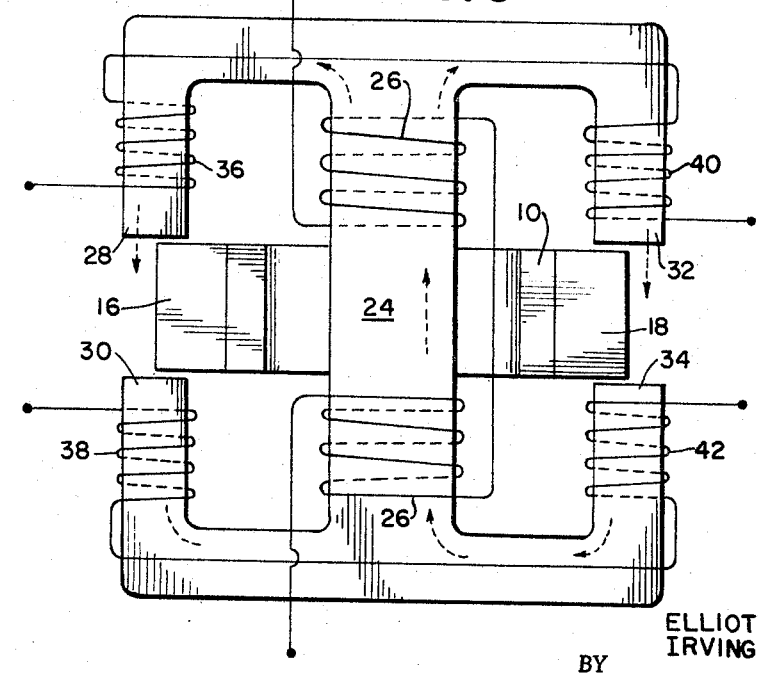
FIG. 3 is a plan view of the stator and armature of FIG. 1 shown in the null position.

Referring now to FIG. 3 the stator 14 is clearly shown as a unitary structure resembling two three-pronged forks joined only at the central tine. The stator 14 made of a magnetically permeable material, comprises a primary core member 24 having primary coils 26 wound thereon. In the embodiment shown the coils 26 are spaced from each other and wound in the same direction. The primary coils 26 are connected to a source of alternating electric curent which, in accordance with the well-known principles of magnetic induction, generate a magnetic flux in the primary core 24.

The stator 14 further comprises two pairs of opposed secondary core members. The first pair, comprising the secondary cores 28 and 30, is located in spaced relationship from one side of the primary core 24. The second pair of opposed secondary core members, comprising secondary cores 32 and 34, is located in spaced relationship from the other side of the primary core 24.

The secondary cores comprising a given pair are each in substantial alignment with the other and spaced to provide a gap through which an end of the armature 10 may pass freely. Thus, the one pair of secondary cores 28 and 30 provide a gap through which the inset 16 of armature 10 may pass while the other pair of secondary cores 32 and 34 provide a similar gap through which the inset 18 may pass.

Where, as in the embodiments shown, the primary core 24 and the secondary cores 28, 30, 32, and 34 are in substantially co-planar relationship with each other the structure of the armature 10 is preferably in the form of a yoke as best seen in FIGS. 1 and 2. This structure permits the ends of the armature 10 to be disposed between the gaps formed by the opposed pairs of secondary cores while avoiding contact with the primary core 24. Thus the structures of the stator 14 and the yoked or indented armature 10 cooperate to provide a compact signal means.

Each secondary core element 28, 30, 32 and 34 has a secondary coil wound thereon; namely, secondary coils 36, 38, 40, and 42 respectively. Secondary coils 36 and 38 have windings in the same direction. Secondary coils 40 and 42 are wound in the same direction with each other but in a direction opposite to the turns of coils 36 and 38.

As noted above, when a current is passed through the primary coils 26 a magnetic flux is induced in the primary core 24. The magnetic lines of force may be visualized at a given moment as emanating from one end of the primary core 24, radiating toward the secondary cores 28 and 32, crossing the respective air gaps to the secondary cores 30 and 34 and converging at the other end of the primary core 24. Thus two loops of magnetic flux are established. A representation of the course of the magnetic flux for a given instant is indicated by the dashed arrows in FIG. 3. The path is opposite when the current in the coils 26 reverses.

The successive build-up and collapse of magnetic flux resulting from the alternating current in the coils 26 in turn tends to generate electric potentials in the secondary coils 36, 38, 40, and 42. This effect, of course, would tend to cause a current flow through the secondary circuit shown schematically in FIG. 3. However, assuming the absence of the armature 10 for the moment, there would be no current flow in the secondary circuit because the secondary coils 36 and 38 are wound equal and opposite to the secondary coils 40 and 42 causing a cancellation of the electric potential forces so that there is no net current flow. Thus, there would be no signal generated which could be recognized or utilized.

The result is the same where, as illustrated in the drawings, the armature 10 is located such that the magnetic flux across each air gap defined by the opposed secondary cores is equal. However, when the armature 10 moves out of the null position—to the left, say, in FIG. 3—a greater portion of the magnetically permeable inset 16 fills the gap between the cores 28 and 30 while a correspondingly lesser portion of the inset 18 is removed from the gap between the cores 32 and 34. In this condition a greater magnetic flux crosses the gap between cores 28 and 30 than crosses the gap between the cores 32 and 34. This is because the interposition of the greater area of the inset 16 lowers the resistance to the flux crossing at that point.

The strengthened magnetic field in the area of the secondary coils 36 and 38 induces a higher potential in those coils than in the coils 40 and 42. The result is a net signal which reflects the degree of movement of the armature.

A similar but opposite effect occurs when the armature 10 is moved to the right.

The advantages of a pick-off device made in accordance with the invention are several. A principal advantage is that the magnetic field through which the armature moves is highly directional and highly concentrated. For example, referring to the opposed secondary cores 28 and 30, it can be seen that the magnetic lines of force will tend to be confined in a narrow path across the gap formed between the cores rather than stray to other portions of the stator such as the primary core 24. Such straying or short circuiting of the magnetic flux might be more likely to occur were the primary core 24 gapped like the secondary cores and not a solid member as illustrated here.

It is noted that some deflection of the magnetic lines of force crossing the secondary gaps towards the primary core 24 occurs due to the presence of the insets 16 and 18. The chances of a deflection of this type occurring and causing a short circuiting of the flux is further reduced by the embodiment of FIG. 2 which positions the insets 20 and 22 a greater distance away from the primary core 24.

Another advantage of the pick-off means of the invention is the strength of the signal generated. Because of the pair relationship of the opposed coils 36, 38, 40, and 42 the weakening of the output of one pair coupled with the strengthening of the output of the other pair produces an output signal of substantially greater magnitude than that produced by conventional means.

Further, this pick-off system is not affected by a slight axial twist which might occur in the armature bar. The reason is that during such axial twisting each end of the armature 10 would be disposed within a secondary gap in the same relationship as the other. Similarly, were the armature 10 moved laterally from side to side (up and down in FIG. 3), there would be no change in the relative positions of the armature ends within the secondary gaps and thus no signal error is produced.

We claim:

1. In means for translating substantially linear movement of an armature (10) into an electric signal wherein two secondary core members (28 and 32) are cojoined with a secondary coil (36 and 40) on each and are spaced from two additional secondary core members (30 and 34) cojoined with a secondary coil (38 and 42) on each to form two pairs (28, 30 and 32, 34) of opposed secondary core members, and magnetically permeable end portions of the armature (10) are oriented to move along paths substantially uniformly spaced between the respective two pairs (28, 30 and 32, 34) of opposed secondary core members, the improvement which comprises
(a) a primary core member (24) disposed between said pairs (28, 30 and 32, 34) and connecting the first mentioned two cojoined secondary core members (28 and 32) with the second mentioned two cojoined secondary core members (30 and 34), and
(b) a primary coil (26) on said primary core member (24) for generating a pair of magnetic flux loops through the primary core member and the respective pairs (28, 30 and 32, 34) of secondary core members,
(c) whereby the armature (10) is free of magnetizing means and the primary and secondary core members constitute a magnetically unitary stator supporting all of the coils.

2. Means according to claim 1 wherein the secondary coils (36 and 40) on the first mentioned cojoined two secondary core members (28 and 32) are in series and oppositely wound, and the secondary coils (38 and 42) on the second mentioned cojoined two secondary core members (30 and 34) are in series and oppositely wound, with the secondary coils (36, 38 and 40, 42) on each opposed pair of secondary core members (28, 30 and 32, 34) being wound in the same direction.

3. Means according to claim 1 wherein magnetically permeable insets (16 and 18) are provided in the end portions of the armature (10).

4. Means according to claim 1 wherein the primary and secondary core members are substantially coplanar and the armature is substantially in the form of a yoke.

5. Means according to claim 1 wherein the armature is responsive to the precession of a gyroscope.

References Cited

UNITED STATES PATENTS

| | | | |
|---|---|---|---|
| 2,269,453 | 1/1942 | Gayhart | 336—134 |
| 2,423,864 | 7/1947 | Washburn et al. | 336—134 |
| 3,079,574 | 2/1963 | Garcia | 336—135 |
| 3,137,812 | 6/1964 | Andersen | 336—134 |

LEWIS H. MYERS, *Primary Examiner.*

THOMAS J. KOZMA, *Assistant Examiner.*

U.S. Cl. X.R.

335—266